(12) United States Patent
Ong et al.

(10) Patent No.: US 8,045,481 B2
(45) Date of Patent: Oct. 25, 2011

(54) SYSTEM AND METHOD FOR SUPPORTING VIRTUALIZED LINKS AT AN EXTERIOR NETWORK-TO-NETWORK INTERFACE

(75) Inventors: Lyndon Y. Ong, Sunnyvale, CA (US); Neena Aluri, Alpharetta, GA (US); Alessandro Fabbri, Roswell, GA (US); Steven P. Curtis, Atlanta, GA (US); Vagish Madrahalli, Woodstock, GA (US); Yalin Wang, San Jose, CA (US)

(73) Assignee: Ciena Corporation, Linthicum, MD (US)

(*) Notice: Subject to any disclaimer, the term of this patent is extended or adjusted under 35 U.S.C. 154(b) by 474 days.

(21) Appl. No.: 11/584,227

(22) Filed: Oct. 20, 2006

(65) Prior Publication Data

US 2008/0095176 A1 Apr. 24, 2008

(51) Int. Cl.
*H04L 12/28* (2006.01)
(52) U.S. Cl. ........ 370/254; 370/392; 370/400; 370/401; 370/409
(58) Field of Classification Search .......... 370/254, 370/392, 400, 401, 409; 709/242
See application file for complete search history.

(56) References Cited

U.S. PATENT DOCUMENTS

| | | | | |
|---|---|---|---|---|
| 5,652,751 A * | 7/1997 | Sharony | | 370/227 |
| 6,456,600 B1 * | 9/2002 | Rochberger et al. | | 370/255 |
| 6,532,237 B1 * | 3/2003 | Or et al. | | 370/396 |
| 2001/0017845 A1 * | 8/2001 | Bauer | | 370/238 |
| 2004/0004955 A1 * | 1/2004 | Lewis | | 370/351 |
| 2004/0205239 A1 * | 10/2004 | Doshi et al. | | 709/241 |
| 2005/0152284 A1 * | 7/2005 | Kotha et al. | | 370/254 |
| 2008/0037532 A1 * | 2/2008 | Sykes et al. | | 370/389 |

OTHER PUBLICATIONS

Ong, Lyndon et al. "Intra-Carrier E-NNI Signaling Specification" Feb. 27, 2004.*

* cited by examiner

*Primary Examiner* — Dang Ton
*Assistant Examiner* — Robert M Morlan
(74) *Attorney, Agent, or Firm* — Clements Bernard PLLC; Christopher L. Bernard; Lawrence A. Baratta, Jr.

(57) ABSTRACT

The present invention provides systems and methods for abstracting a network topology into virtual links and supporting both generic and instantiated virtualized links for linking a virtualized topology with actual resources within a domain, providing security over network topology information, providing control over the allocation of resources, and reducing the complexity of advertising.

17 Claims, 7 Drawing Sheets

SYSTEM AND METHOD FOR SUPPORTING VIRTUALIZED LINKS AT AN EXTERIOR NETWORK-TO-NETWORK INTERFACE

FIELD OF THE INVENTION

The present invention relates generally to network topology abstraction processes, virtual topologies, and the interoperability of intelligent optical networks. More specifically, the present invention relates to a system and a method for abstracting a network topology into virtual links and supporting both generic and instantiated virtualized links for linking a virtualized topology with actual resources within a domain, providing security over network topology information, providing control over the allocation of resources, and reducing the complexity of advertising.

BACKGROUND OF THE INVENTION

In networks that are compartmentalized into independent domains (e.g., Automatically Switched Optical Networks (ASONs) and Virtual Private Networks (VPNs)), it is a common technique to virtualize the topology within the domain and then advertise the virtual topology to external domains for path computation purposes. Currently, there are no accepted techniques for linking the virtualized topology with actual resources within the domain, in order to control resource utilization. In fact, the virtual topology is typically assumed to have no relationship to the true topology within the domain, allowing any domain resources to be used regardless of the path computed by the source.

The current approach to virtualization of topology makes it impossible for a carrier to provide meaningful information about the status and utilization of resources within its domain, without advertising the full domain topology. As a result, it is difficult to provide guarantees of connection availability based on the advertised topology. A system and method are needed wherein this meaningful information is provided without advertising the full domain topology.

Interoperability of intelligent optical networks will be enabled by an Exterior Network-Network Interface (E-NNI) with control plane messaging. Standards for this interface are being defined in the ITU-T (Automatically Switched Optical Networks) and the IETF (Generalized Multi-Protocol Label Switching), where the control plane supports both routing protocol and signaling protocol. E-NNI is a control plane messaging interface for ASON.

The ASON E-NNI allows a particular network or control domain to advertise a virtualized topology to other networks or control domains in order to reduce the complexity of advertising and to allow policy control over the information leaked to other networks about the true arrangement of links and nodes within the network. Other networks can then request services from the domain using signaling messages that request particular paths across a domain based on the virtual topology.

These services may be requested originally from either a client device, set up and released by the customer on demand using signaling and routing protocols (in which case it is called a Switched Connection), or a management system interface, set up and released from the management system, which uses network generated signaling and routing protocols to establish the connection (in which case it is called a Soft Permanent Connection), and the requesting entity may be either part of the domain or part of an exterior network or domain.

While these virtualized topologies allow considerable flexibility in how a domain advertises its resources to other networks or domains, it is still important for the domain to implement policies that support some type of control over how it allocates resources for a connection request from another network or domain. In particular, the advertisement of the virtual topology can be manipulated to control aspects of requests from other networks, for example, to indicate to other networks that some paths are temporarily or permanently unavailable and thereby stop other networks from requesting services that would utilize these paths.

Thus, what is needed is a system and a method for abstracting a network topology into virtual links and supporting both generic and instantiated virtualized links for linking a virtualized topology with actual resources within a domain, providing security over network topology information, providing control over the allocation of resources, and reducing the complexity of advertising. Additionally, a system and method are needed wherein this meaningful information is provided without advertising the full domain topology.

BRIEF SUMMARY OF THE INVENTION

In various exemplary embodiments, the present invention provides systems and methods for abstracting a network topology into virtual links and supporting both generic and instantiated virtualized links for linking a virtualized topology with actual resources within a domain, providing security over network topology information, providing control over the allocation of resources, and reducing the complexity of network advertising.

In one exemplary embodiment, the present invention provides a system for deriving a virtualized topology from a physical network topology and linking the virtualized topology with actual resources in the physical network topology in order to control resource utilization, including: a control domain, a plurality of nodes representing the actual resources located with the control domain, a routing controller, a plurality of virtual links, wherein a virtual link provides a communication path between two nodes, and a path computation selector, wherein the path computation selector analyzes the plurality of virtual links to determine the types of virtual links and thereby compute a network path over a determined set of network resources. Only the virtual topology is advertised and not all actual resources within the control domain. The complexity of network advertising is reduced and the advertisement of the virtual topology is manipulated to control aspects of requests from external networks. The virtualized topology is linked with actual resources in the physical network topology in order to control resource utilization. Security over the physical network topology information is provided by not advertising all of the actual resources within the control domain. At least one of the plurality of nodes is a border node that hosts an exterior network-to-network interface (E-NNI). Optionally, the system includes one or more interior node, wherein the one or more interior node does not host an exterior network-to-network interface (E-NNI). Optionally, the system includes one or more virtual node, wherein the one or more virtual node has no corresponding real node in the physical network topology of the control domain and is used for external advertisement purposes. Optionally, the plurality of virtual links is comprised of generic virtual links, wherein generic virtual links indicate a general ability to support connectivity between two nodes by the control domain, regardless of the type or the role of the node, over any communication path that is available at a time a connection request is received. Optionally, the generic virtual links are binary, wherein the generic virtual links are advertised as being up or down, having available bandwidth or not having available bandwidth, in response to a network policy or in response to a network condition. Optionally, the plurality of virtual links is comprised of instantiated virtual links, wherein instantiated virtual links indicate a physical path between two nodes in the virtual topology to be used for connectivity between the two nodes across the control domain. Optionally, the plurality of virtual links is comprised of both generic virtual links and instantiated virtual links.

In another exemplary embodiment, the present invention provides a method for deriving a virtualized topology from a physical network topology and linking the virtualized topology with actual resources in the physical network topology in order to control resource utilization, including: establishing a control domain, abstracting a plurality of nodes representing the actual resources located with the control domain, implementing a routing controller, establishing by abstraction a plurality of virtual links, wherein a virtual link provides a communication path between two nodes, linking the virtualized topology with actual resources in the physical network topology in order to control resource utilization; implementing a path computation selector, wherein the path computation selector analyzes the plurality of virtual links to determine the types of virtual links and thereby compute a network path over a determined set of network resources, advertising the virtual topology to a one or more external domain, wherein only the virtual topology is advertised and not all actual resources within the control domain, reducing the complexity of advertising, wherein the complexity of network advertising is reduced and the advertisement of the virtual topology is manipulated to control aspects of requests from external networks, controlling the resource allocation and utilization by policy; and providing security over the physical network topology information by not advertising all of the actual resources within the control domain. At least one of the plurality of nodes is a border node that hosts an exterior network-to-network interface (E-NNI). Optionally the method includes one or more interior node, wherein the one or more interior node does not host an exterior network-to-network interface (E-NNI). Optionally the method includes one or more virtual node, wherein the one or more virtual node has no corresponding real node in the physical network topology of the control domain and is used for external advertisement purposes. Optionally, the plurality of virtual links is comprised of generic virtual links, wherein generic virtual links indicate a general ability to support connectivity between two nodes by the control domain, regardless of the type or the role of the node, over any communication path that is available at a time a connection request is received. Optionally, the generic virtual links are binary, wherein the generic virtual links are advertised as being up or down, having available bandwidth or not having available bandwidth, in response to a network policy or in response to a network condition. Optionally, the plurality of virtual links is comprised of instantiated virtual links, wherein instantiated virtual links indicate a physical path between two nodes in the virtual topology to be used for connectivity between the two nodes across the control domain. Optionally, the plurality of virtual links is comprised of both generic virtual links and instantiated virtual links.

In further exemplary embodiment of the present invention, the present invention provides an apparatus, including: logic configured to generate a plurality of virtual links in a control domain, wherein each virtual link represents connectivity between two nodes in the control domain, logic configured to advertise the plurality of virtual links to external networks, logic configured to analyze the available virtual links to determine the types of virtual links and thereby compute a network path over a determined set of network resources, and logic configured to route received requests for services based on the advertised virtual topology. Optionally, the plurality of virtual links are generic virtual links, wherein generic virtual links indicate a general ability to support connectivity between two nodes by the control domain, regardless of the type or the role of the node, over any communication path that is available at a time a connection request is received. Optionally, the generic virtual links are binary, wherein the generic virtual links are advertised as being up or down, having available bandwidth or not having available bandwidth, in response to a network policy or in response to a network condition. Optionally, the plurality of virtual links is comprised of instantiated virtual links, wherein instantiated virtual links indicate a physical path between two nodes in the virtual topology to be used for connectivity between the two nodes across the control domain. Optionally, the plurality of virtual links is comprised of both generic virtual links and instantiated virtual links.

Advantageously, the system and method for supporting virtualized links at an E-NNI of the present invention provides control over the security of the network topology information. Additionally, the system and method provide control over policy of how external connection requests from other networks or control domains are handled in the network. This control over both security and policy protects information about the true arrangement of links and nodes within the network.

Advantageously, the system and method for supporting virtualized links at an E-NNI of the present invention also provides the ability to simplify the advertised topology, thus reducing complexity and improving scalability. Furthermore, the system and method advantageously provide the ability to conceal or reflect the true status of resources in their network and the ability to thereby control the rate of connection requests received from other networks or control domains, either under normal conditions or in a failure situation.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following detailed description of an exemplary embodiment which is illustrated in the accompanying drawings.

BRIEF DESCRIPTION OF THE DRAWINGS

The present invention is illustrated and described herein with reference to the various drawings, in which like reference numbers denote like system components and/or method steps, as appropriate, and in which.

DETAILED DESCRIPTION OF THE INVENTION

Before describing the disclosed embodiments of the present invention in detail, it is to be understood that the invention is not limited in its application to the details of the particular arrangement shown here since the invention is capable of other embodiments. Also, the terminology used herein is for the purpose of description and not of limitation.

The present invention provides a system and a method for abstracting a network topology into virtual links and supporting both generic and instantiated virtualized links for linking a virtualized topology with actual resources within a domain, providing security over network topology information, providing control over the allocation of resources, and reducing the complexity of advertising.

Figure 1:
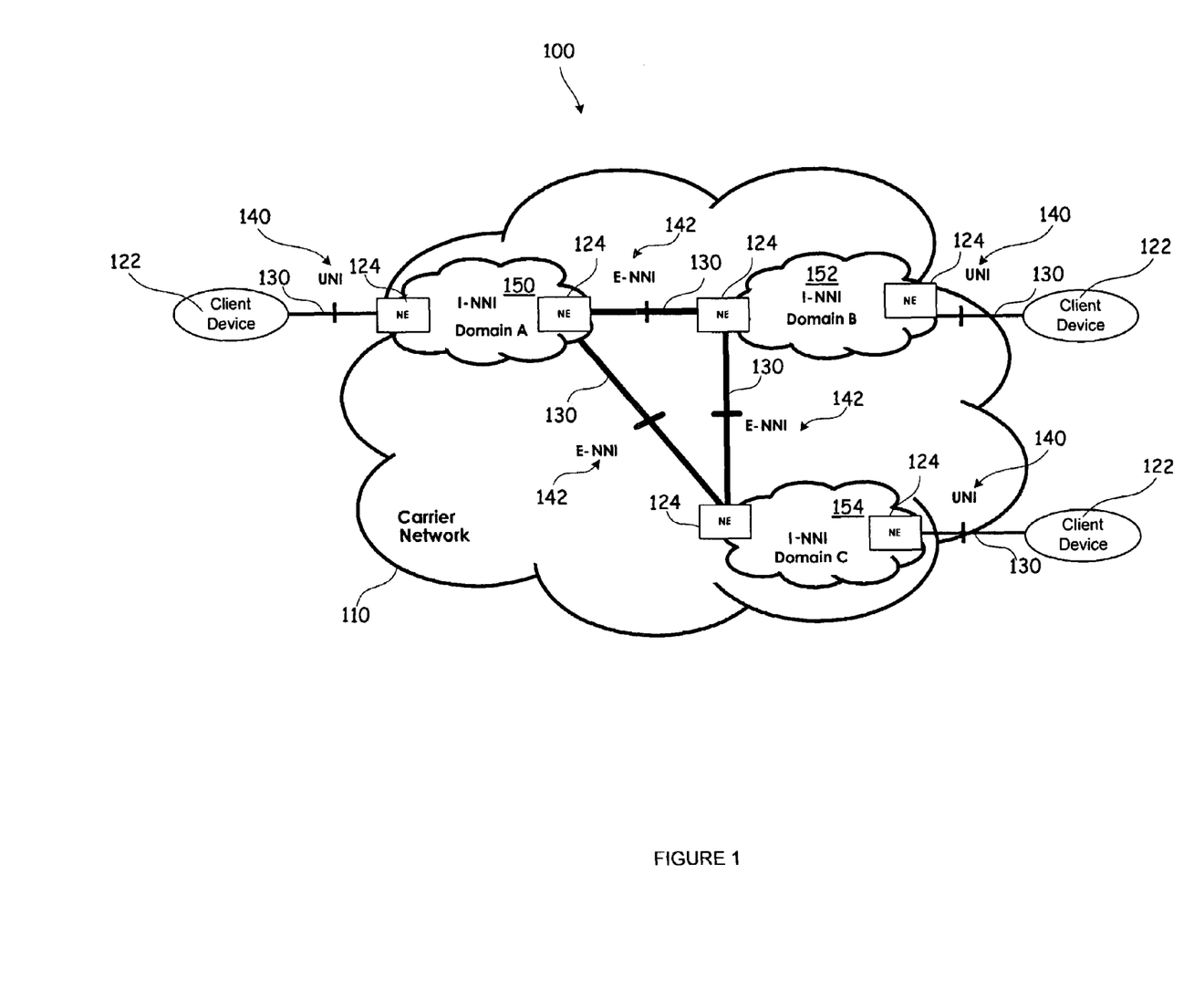
FIG. 1 is a schematic diagram illustrating the overall architecture of an automatically switched optical network (ASON) with both E-NNI and UNI control plane messaging interfaces, and further illustrating a plurality of network elements in each control domain of the carrier network.

Referring now to FIG. 1, a schematic diagram illustrating the overall architecture of an automatically switched optical network (ASON) 100 is shown. The overall ASON architecture 100 is shown with a plurality of control domains (i.e., Control domain A 150, control domain B 152, and control domain C 154 in a carrier network 110. The ASON architecture 100 is shown being accessed by both multiple E-NNI (Exterior Network-Network Interface) 142 and multiple UNI (User Network Interface) 140 control plane messaging interfaces. The UNI 140 provides the interface to and from client devices 122, and the E-NNI 142 provides the interface between control domains 150, 152, and 154. Intra-network communication is conducted using the I-NNI interface as shown within each control domain 150, 152, and 154.

The ASON E-NNI 142 allows a particular network or control domain 150, 152, or 154 (i.e., domain A 150) to advertise a virtualized topology to other networks or control domains (i.e., domain B 152, domain C 154, or other domains outside of the carrier network 110) in order to reduce the complexity of advertising and to allow policy control over the information leaked to other networks about the true arrangement of actual physical links 130 and actual physical nodes 124 within the network 110. Other networks can then request services from domain A 150, for example, using signaling messages that request particular paths across a domain A 150 based on the advertised virtual topology.

Figure 2:
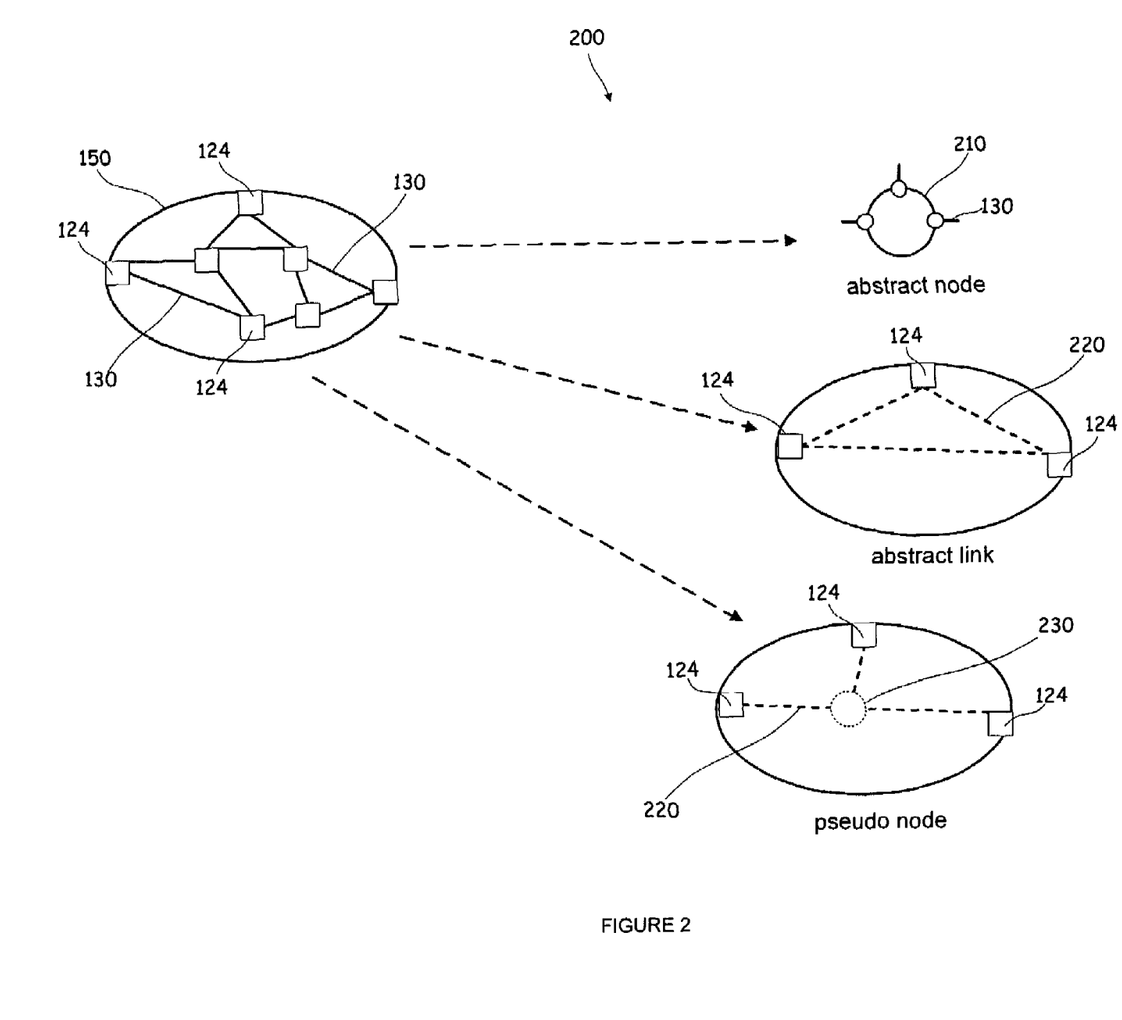
FIG. 2 is a schematic diagram illustrating the representative virtual topologies: abstract nodes, abstract links, and pseudo nodes, that are abstracted from actual physical links and actual physical nodes of a physical network in a control domain.

Referring now to FIG. 2, a schematic diagram illustrating three representative virtual topologies 200 abstracted from a physical network: abstract nodes 210, abstract links 220, and pseudo nodes 230, that are abstracted from and/or with reference to actual physical links 130 and actual physical nodes 124 of a physical network in a control domain (i.e., domain A 150) is shown.

The third representative virtual topology, pertaining to pseudo nodes 230, is disclosed in U.S. patent application Ser. No. 10/961,229, filed on Oct. 12, 2004, and entitled "Scalable Abstraction of Topology Across Domain Boundaries," which is incorporated in its entirety by reference herein. Pseudo nodes 230 are virtual nodes that have no corresponding real node in the internal physical topology (not actually located in the physical control domain 150), and are only used for external advertisement purposes to other control domains or networks.

The services requested over these representative virtual topologies 200 may be requested originally from either a client device 122 (as shown in FIG. 1), set up and released by the customer on demand using signaling and routing protocols (a switched connection), or a management system interface, set up and released from the management system, which uses network generated signaling and routing protocols to establish the connection (a Soft Permanent Connection), and the requesting entity may be either part of the control domain 150 or part of an exterior network or domain (i.e., domain B 152, domain C 154, or other domains outside of the carrier network 110 as shown in FIG. 1).

While these representative virtualized topologies 200 allow considerable flexibility in how a domain (i.e., domain A 150) advertises its resources to other networks or domains (i.e., domain B 152, domain C 154, or other domains outside of the carrier network 110 as shown in FIG. 1), it is still important for the domain 150 to implement policies that support some type of control over how it allocates resources for a connection request from another network or domain 152, 154. In particular, the advertisement of the virtual topology 210, 220, or 230, for example, may be manipulated to control aspects of requests from other networks, for example, to indicate to other networks that some paths are temporarily or permanently unavailable and thereby stop other networks from requesting services that would utilize these paths.

Figure 3:
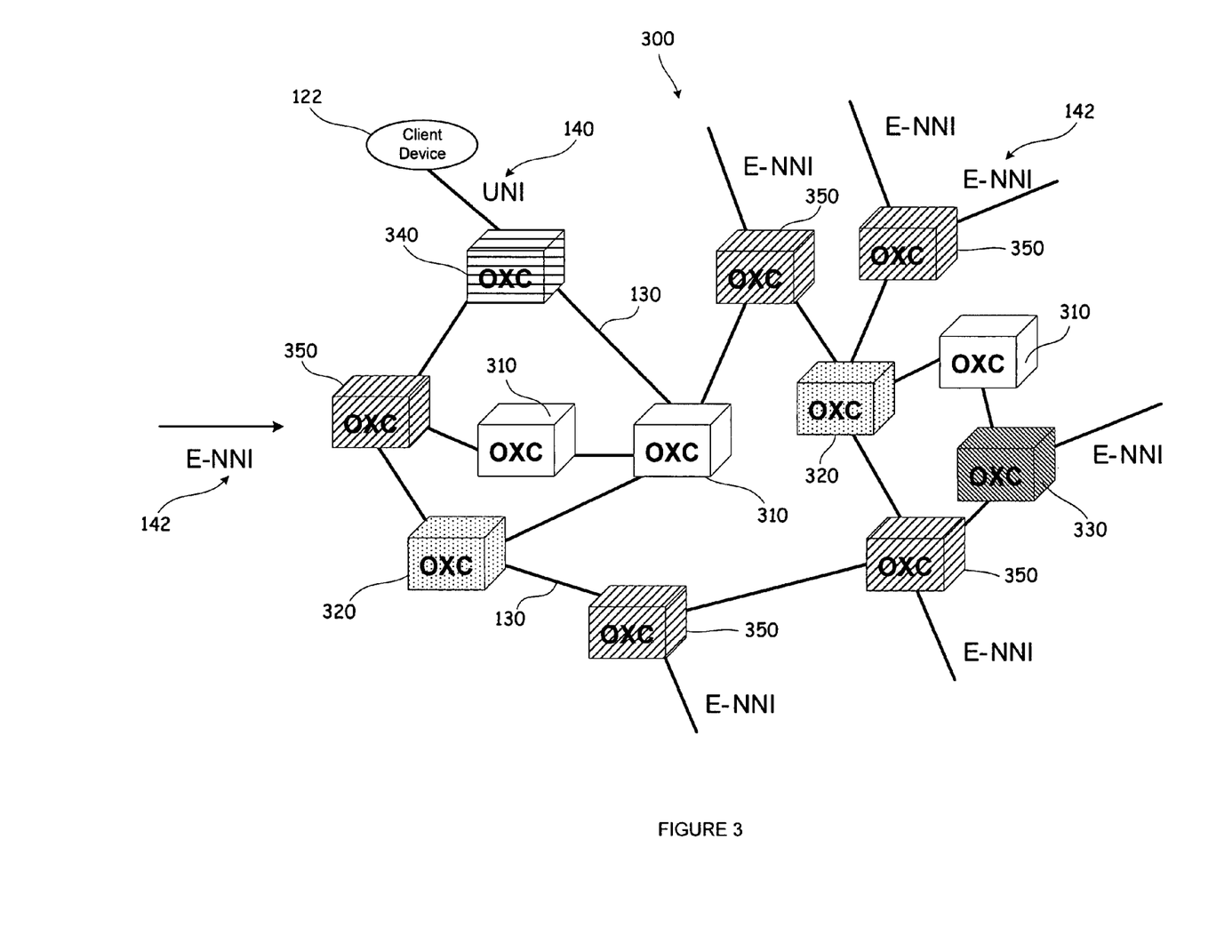
FIG. 3 is a schematic diagram illustrating a physical network being controlled and the various optical cross connects functioning as border nodes, pseudo nodes, interior nodes, and routing controllers, and further illustrating the E-NNI and UNI control plane messaging interfaces.

Referring now to FIG. 3, a schematic diagram illustrating a physical network 300 being controlled over various physical links 130 and the various optical cross connects (OXC) 310 (such as the Ciena Core Director, for example) functioning as border nodes 350, pseudo nodes 230 (not shown in FIG. 3), interior nodes 340, routing controllers 320, and an optical cross connect functioning as a routing controller and a border node 330 is shown. Optionally, the routing controller 320 is a separate system from the cross connects. FIG. 3 further illustrates the E-NNI 142 and UNI 140 control plane messaging interfaces, wherein a UNI 140 is used when accessed from a client device 122, and an E-NNI 142 is used between control domains.

A border node 350 is a node that hosts at least one E-NNI interface 142. A routing controller 320 is not part of the physical topology. The routing controller 320 is responsible for routing dissemination. An interior node 340 is a node that does not host an E-NNI interface 142. The physical network 300 is shown with various physical links 130 connecting the devices in the physical network 300.

Figure 4:
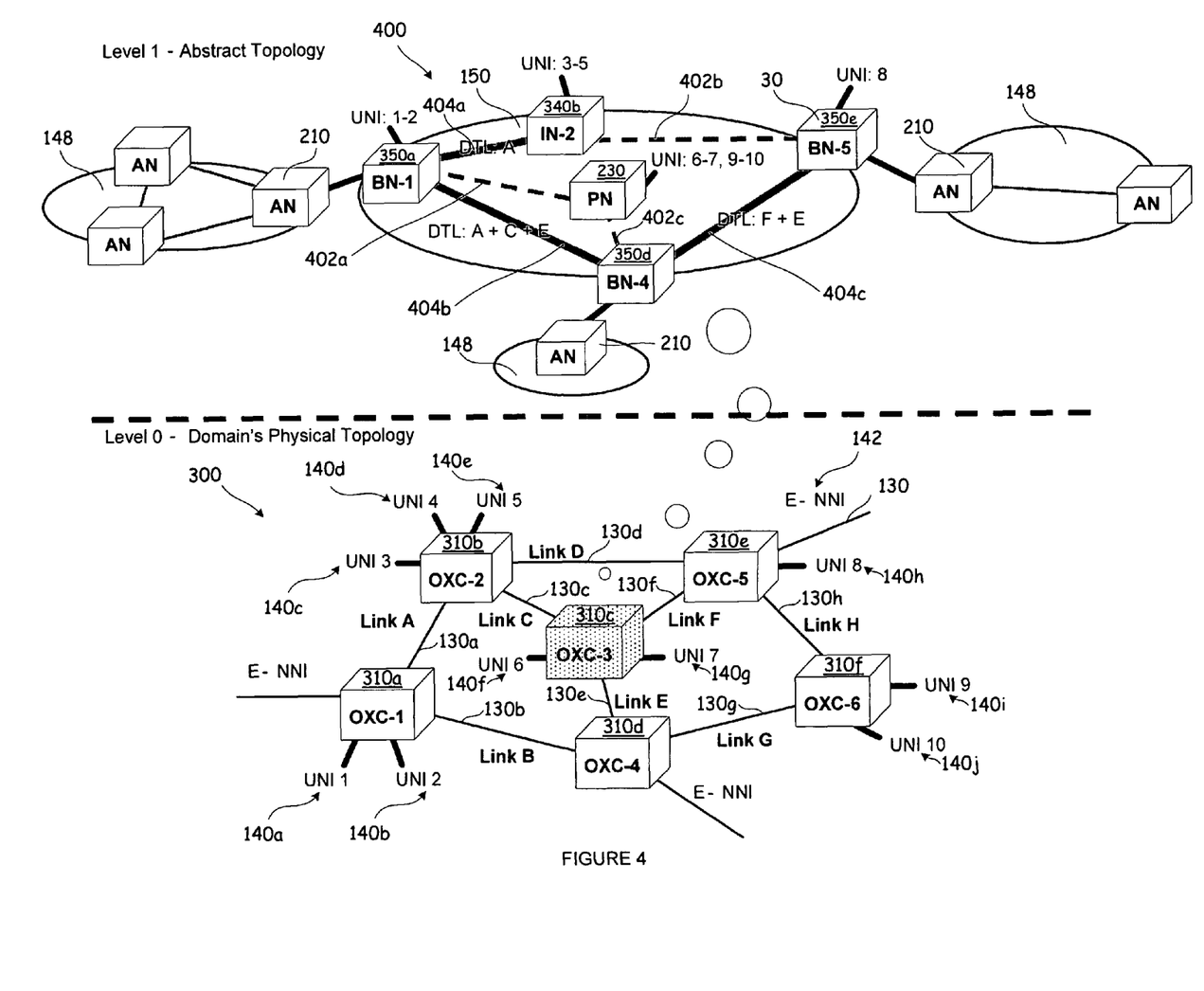
FIG. 4 is a schematic diagram illustrating a representative virtual network topology as abstracted from the actual physical network topology and further illustrating abstract nodes, pseudo nodes, interior nodes, and border nodes, according to an embodiment of the present invention.

Referring now to FIG. 4, a schematic diagram illustrating a representative virtual network topology 400 as abstracted from the domain's actual physical network topology 300, physical links 130, and various optical cross connects (OXC) 310a-310h is shown. The virtual topology 400 and the physical topology 300, from which the virtual topology 400 is abstracted, are shown separated by a dashed line.

The actual physical topology 300 (as used in FIGS. 4, 5, and 6) for the domain includes, in this example, OXC-1 310a, OXC-2 310b, OXC-3 310c, OXC-4 301d, OXC-5 310e, and OXC-6 310f. The actual physical topology 300, in this example, also includes ten UNI control plane messaging interfaces 140a-140j and various E-NNI control plane messaging interfaces 142. Connecting the various OXCs 310a-310f are actual physical links, link A though link H, 130a-130h.

The virtual network topology 400, which is the virtual topology to be advertised to other networks or control domains, consists of a set of virtual links including generic virtual links 402 and instantiated virtual links 404, for example, and nodes 350a, 350d, 350e, 340b, 230, including the border nodes 350a, 350d, 350e, and optionally one or more interior nodes 340b and one or more pseudo nodes 230. The pseudo node 230 is a virtual node that has no corresponding real node in the internal topology, and is only used for external advertisement purposes.

The system and method for abstracting a network topology provides virtual links 402, 404 for linking a virtualized topology 400 with actual resources within a control domain 150. Both generic virtualized links 202 and instantiated virtualized links 204 are disclosed. The use of these virtualized links 402, 404 provides control over services requested by the E-NNI 142 through control plane messaging.

One system and method provides a completely virtualized topology to be advertised with generic links 402 that have no basis or relationship to the actual network resources it represents. These virtual links are referred to as generic abstract links 402. Generic abstract links 402 indicate a general ability to support connectivity between two E-NNI nodes by the domain 150, whatever the two nodes' types/roles, over any path that may be available at the time a connection request is received.

Another system and method disclosed provides an advertised topology that includes links that are related to actual network resources. These virtual links are referred to as instantiated abstract links 404. An instantiated abstract link 404 indicates a specific physical path between two "mapped" nodes to be used for connectivity between them across the domain 150.

Another system and method disclosed provides an advertised topology that includes both generic abstract links and instantiated abstract links. As shown in FIG. 4 in the virtual network topology 400, there are both generic abstract links 402 and instantiated abstract links 404 that are advertised externally.

Links between mapped nodes, instantiated abstract links 404a-404c, may have physical instantiation (thick lines); links to the pseudo node, generic abstract links 402a-402c (thin dashed lines), cannot.

This system and method allow flexibility for the network operator to reflect actual physical topology 300 within their domain 150 or only a representative virtual topology that has no counterpart at the physical level, with the following benefits: control over the security of their network topology information; control over policy of how external connection requests are handled in their network; ability to simplify their advertised topology to reduce complexity and improve scalability; ability to conceal or reflect the true status of resources in their network; and ability to thereby control the rate of connection requests received from other networks, either under normal conditions or in a failure situation.

Figure 5:
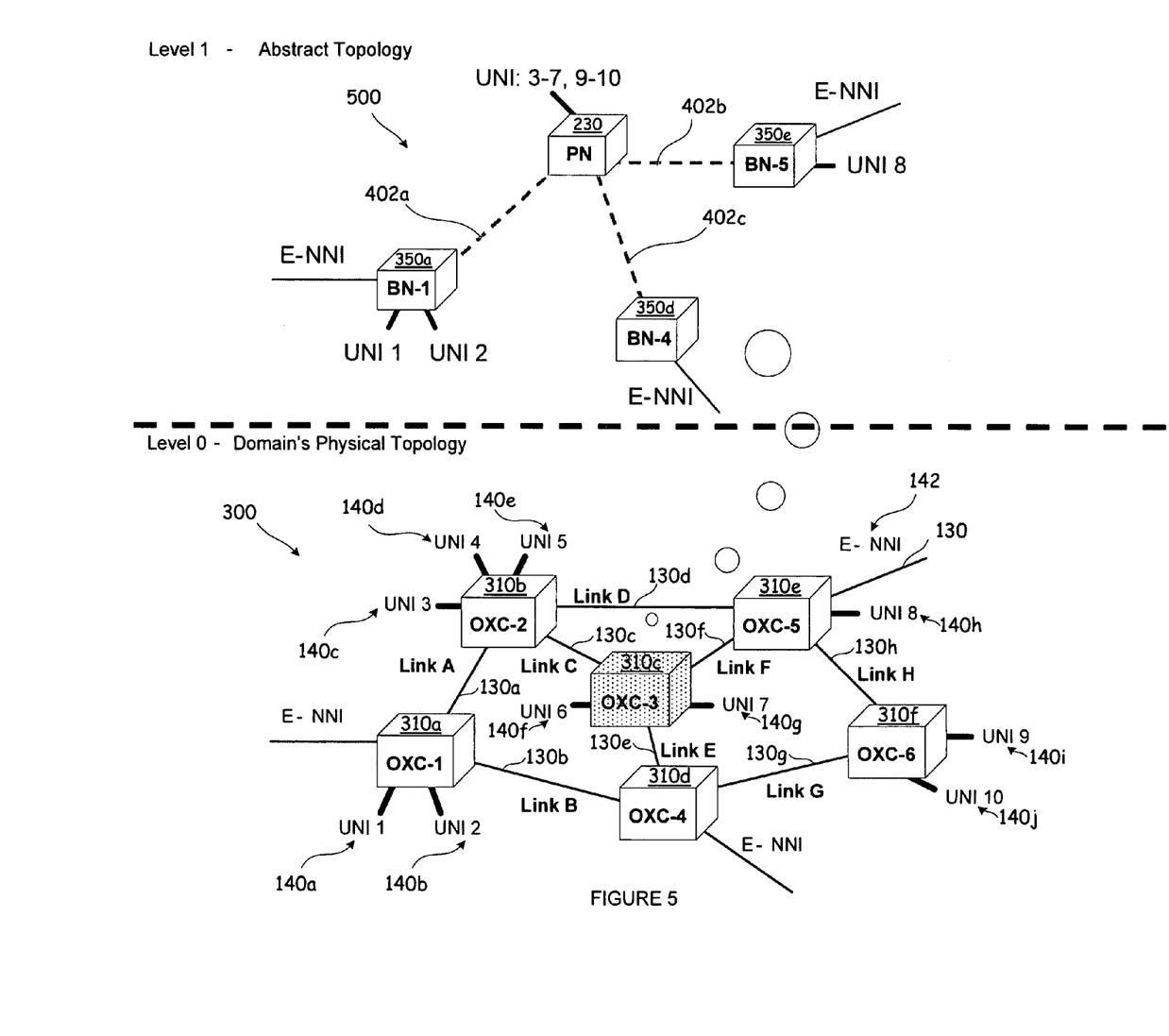
FIG. 5 is a schematic diagram illustrating a representative virtual network topology, as abstracted from an actual physical network topology, with generic abstract links according to an embodiment of the present invention.

Referring now to FIG. 5, a schematic diagram illustrating a representative virtual network topology 500 with generic abstract links 402 as abstracted from the actual physical network topology 300 is shown.

In generic abstract links 402, the network 150 is advertised using completely generic abstract links 402. These links 402 are completely abstract and only used to provide a representation to external networks or domains. In particular, the state of a generic abstract link 402 is not associated with any internal network resources, and is not affected by network resource utilization or failures. A generic abstract link 402 is always considered working and has advertised bandwidth determined by carrier policy without reflecting actual network conditions.

In FIG. 5, for example, a connection request received at border node 1 350a that indicates path border node 1 (BN-1) 350 to pseudo node 230 to border node 5 (BN-5) 350e (or BN1-PN-BN5) in its Explicit Route Object (ERO) could be mapped to any path within the physical topology of the domain. For example, one mapping routes from OXC-1 310a through physical link A 130a to OXC-2 310b through physical link D 130d to OXC-5 310e. Another mapping routes from OXC-1 310a through physical link B 130b to OXC-4 310d through physical link E 130e to OXC-3 310c through link F 130f to OXC-5 310e. The route chosen is based on the availability of bandwidth on the physical links 130 and the costs associated with each link 130.

A subset of generic abstract links 402, called generic abstract binary links, may be advertised as being up or down (i.e., having available bandwidth or no available bandwidth) in response to either network policy or some high level network conditions (e.g., all resources occupied, major failure, or bandwidth restricted to internal traffic).

Figure 6:
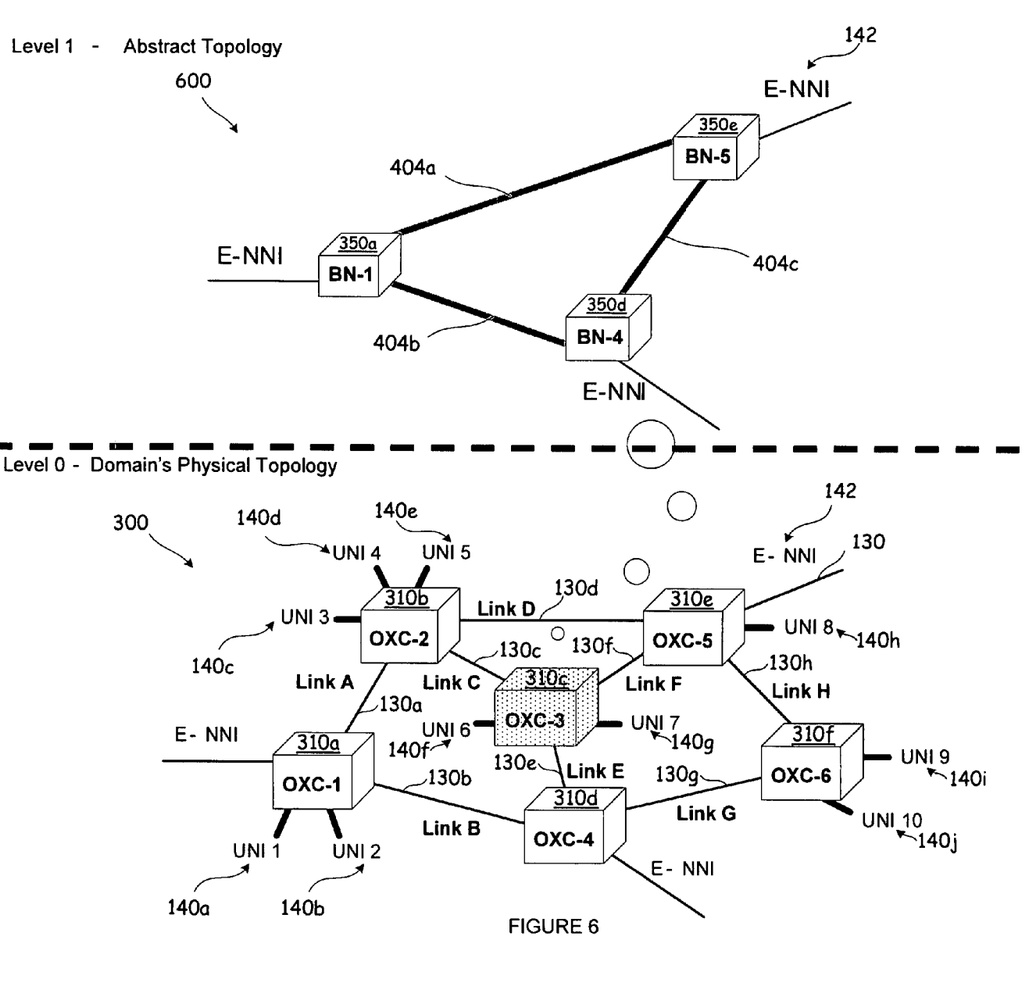
FIG. 6 is a schematic diagram illustrating a representative virtual network topology, as abstracted from an actual physical network topology, with instantiated abstract links, allowing a carrier to control or partition a network to support interior and exterior traffic, according to an embodiment of the present invention.

Referring now to FIG. 6, a schematic diagram illustrating a representative virtual network topology 400 with instantiated abstract links 404 as abstracted from the actual physical network topology 300 is shown. This virtual network topology 400 allows a carrier to control or partition a network to support interior and exterior traffic.

In instantiated abstract links 404, the network is advertised using instantiated abstract links 404, for which there is a predefined relationship to some set of network resources. In instantiated abstract links 404, the link advertisement reflects the actual use of associated resources. As a result, instantiated abstract links 404 may be advertised as failed, if some component of the associated set of resources has failed, and may have bandwidth based on the actual bandwidth availability in its associated set of network resources, e.g., bandwidth limited to the minimum bandwidth on any of its component links.

For example, in FIG. 6, instantiated abstract link 404a border node 1 (BN-1) 350a to BN-5 350e is a combination of link A 130*a* and link D 130*d* in the physical topology 300, instantiated abstract link 404*b* BN-1 350*a* to BN-4 350*d* is mapped to link B 130*b*, and instantiated abstract link 404*c* BN-4 350*d* to BN-5 350*e* is a combination of link G 130*g* and link H 130*h*. Connection requests that are received at BN-1 350*a* that list link BN-1 350*a* to BN-5 350*e* in their explicit route object will only be allocated resources from link A 130*a* and link D 130*d*, although other paths might ordinarily be taken (for example, link A 130*a* to link C 130*c* to link F 130*f*).

Figure 7:
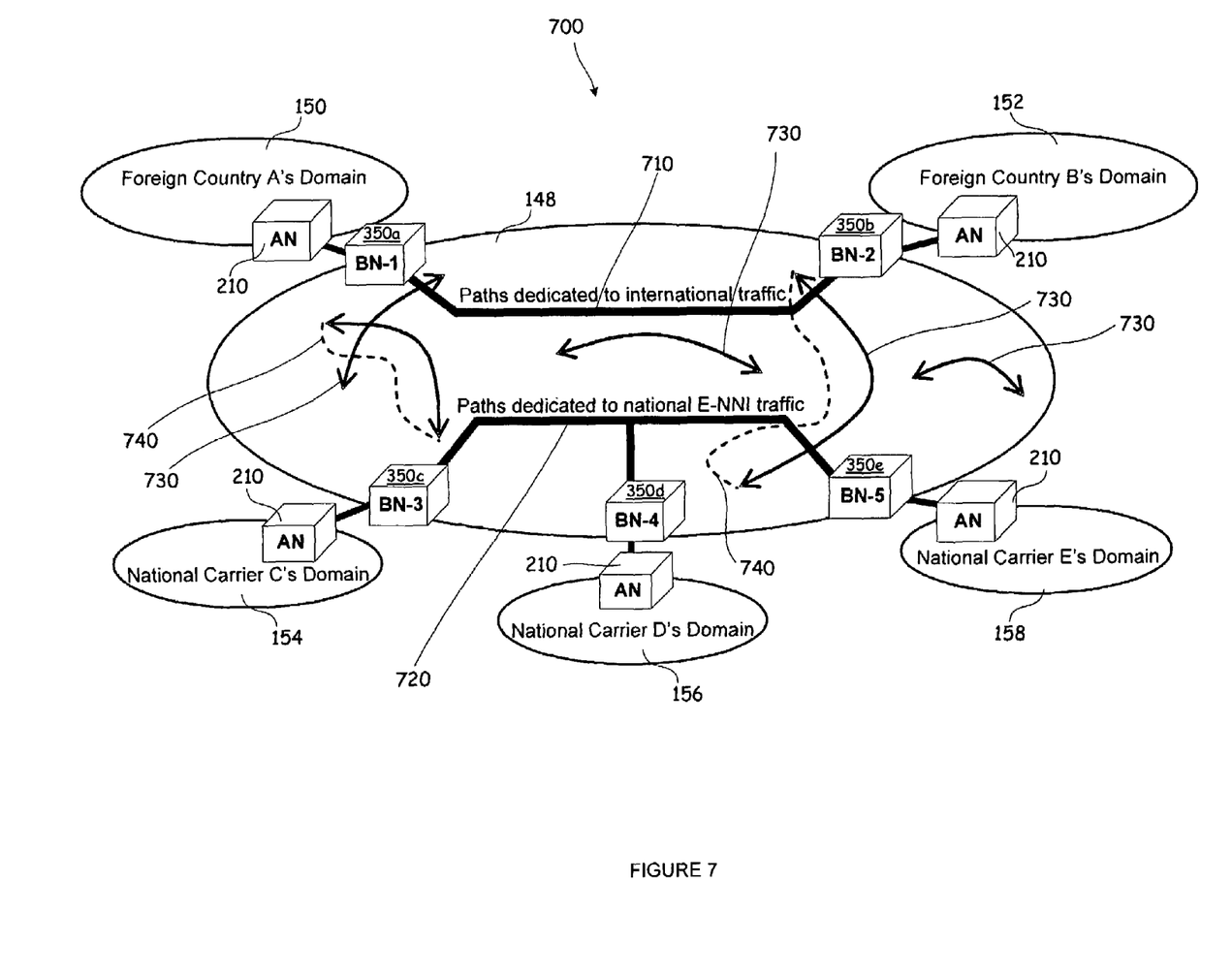
FIG. 7 is a schematic diagram illustrating how instantiated abstract links are used to allow a carrier to control or partition a network to support interior and exterior traffic according to an embodiment of the present invention.

Referring now to FIG. 7, a schematic diagram illustrating how instantiated abstract links 404 (as shown in FIG. 6) are used to allow a carrier to control or partition a network to support interior and exterior traffic is shown. The paths for international traffic 710 and for national E-NNI traffic 720 are shown in a carrier control network 700. Intra-domain connections 730 and restoration paths 740 are also shown.

During the processing of an incoming service request, the path computation algorithm will be dependent on whether generic abstract links 402 or instantiated abstract links 404 are advertised. When the requested explicit route object (ERO) is equal to generic abstract links 402, the path computing algorithm computes the path using any available network resources. When the requested ERO is equal to instantiated abstract links 404, the path computing algorithm computes the path using only the network resources associated with the particular instantiated abstract link(s) 404 in the ERO.

When a connection request reaches a border node 350, a full path over the domain's 150 abstract topology (i.e., 400, 500, 600) must be computed and/or validated. If the request specifies a complete ERO, then ERO validation is conducted and abstract links 402, 404 listed in the ERO are checked for existence, and for ability to support the connection. If the request does not specify an ERO then at least the termination point is specified, hence a path over the entire abstract topology (this domain's 150 and other domain's advertised abstract topologies) that can support the connection is computed, from the point where the connection request was received to the termination point. A prefix of the computed path is going to indicate the domain's exit point, and it is the path over the domain's abstract topology (i.e., 400, 500, 600) that is considered. The remainder of the path is discarded.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A system for deriving a virtualized topology from a physical network topology and linking the virtualized topology with actual resources in the physical network topology in order to control resource utilization, comprising:
   a control domain;
   a plurality of nodes representing actual resources located within the control domain;
   wherein at least one of the plurality of nodes is a border node that hosts an exterior network-to-network interface (E-NNI);
   a routing controller;
   a plurality of virtual links, wherein a virtual link provides a communication path between two nodes;
   a path computation selector, wherein the path computation selector analyzes the plurality of virtual links to determine the types of virtual links and thereby compute a network path over a predetermined set of network resources;
   wherein only the virtualized topology is advertised and not the actual resources within the control domain; and
   wherein the virtualized topology comprises the plurality of virtual links comprising one or more generic virtual links with no basis or relationship to the actual resources and one or more instantiated virtual links representing a specific physical path, and wherein the one or more generic virtual links are selected based on control over security, policy, and concealment of resources of the physical network topology and the one or more instantiated virtual links are selected to enable the virtualized topology to reflect a true status of resources configured thereon.

2. The system of claim 1, further comprising:
   one or more interior nodes, wherein the one or more interior nodes do not host an exterior network-to-network interface (E-NNI).

3. The system of claim 1, further comprising:
   one or more virtual nodes, wherein the one or more virtual nodes have no corresponding real nodes in the physical network topology of the control domain and are used for external advertisement purposes.

4. The system of claim 1, wherein the generic virtual links indicate a general ability to support connectivity between two nodes by the control domain, regardless of the type or the role of the nodes, over any communication path that is available at a time a connection request is received.

5. The system of claim 4, wherein the generic virtual links are binary, wherein the generic virtual links are advertised as being up or down, having available bandwidth or not having available bandwidth, in response to a network policy or in response to a network condition.

6. The system of claim 1, wherein the instantiated virtual links each indicate a physical path between two nodes in the virtualized topology to be used for connectivity between the two nodes across the control domain.

7. A method for deriving a virtualized topology from a physical network topology and linking the virtualized topology with actual resources in the physical network topology in order to control resource utilization, comprising:
   establishing a control domain;
   abstracting a plurality of nodes representing actual resources located within the control domain;
   implementing a routing controller;
   establishing a plurality of virtual links, the plurality of virtual links comprising one or more generic virtual links with no basis or relationship to the actual resources and one or more instantiated virtual links representing a specific physical path, and wherein the one or more generic virtual links are selected based on control over security, policy, and concealment of resources of the physical network topology and the one or more instantiated virtual links are selected to enable the virtualized topology to reflect a true status of resources configured thereon;
   linking the virtualized topology with the actual resources in the physical network topology and accounting for unavailable resources in the physical network topology in the virtualized topology in order to control resource utilization;
   implementing a path computation selector, wherein the path computation selector analyzes the plurality of virtual links to determine the types of virtual links and thereby compute a network path over a predetermined set of network resources;

advertising the virtualized topology to one or more external domains, wherein only the virtualized topology is advertised and not the actual resources within the control domain, wherein the one or more external domains are configured to request the actual resources based on the advertised virtualized topology;

controlling the resource allocation and utilization by policy; and providing security over physical network topology information by not advertising the actual resources within the control domain.

8. The method of claim 7, further comprising:
one or more interior nodes, wherein the one or more interior nodes do not host an exterior network-to-network interface (E-NNI).

9. The method of claim 7, further comprising:
one or more virtual nodes, wherein the one or more virtual nodes have no corresponding real nodes in the physical network topology of the control domain and are used for external advertisement purposes.

10. The method of claim 7, wherein the generic virtual links indicate a general ability to support connectivity between two nodes by the control domain, regardless of the type or the role of the nodes, over any communication path that is available at a time a connection request is received.

11. The method of claim 10, wherein the generic virtual links are binary, wherein the generic virtual links are advertised as being up or down, having available bandwidth or not having available bandwidth, in response to a network policy or in response to a network condition.

12. The method of claim 7, wherein the instantiated virtual links each indicate a physical path between two nodes in the virtualized topology to be used for connectivity between the two nodes across the control domain.

13. An apparatus, comprising:
logic configured to generate a plurality of virtual links in a control domain, the plurality of virtual links comprising one or more generic virtual links with no basis or relationship to the actual resources and one or more instantiated virtual links representing a specific physical path, and wherein the one or more generic virtual links are selected based on control over security, policy, and concealment of resources of the physical network topology and the one or more instantiated virtual links are selected to enable the virtualized topology to reflect a true status of resources configured thereon;

logic configured to advertise the plurality of virtual links to external networks;

logic configured to analyze the available virtual links to determine the types of virtual links and thereby compute a network path over a predetermined set of network resources; and logic configured to route received requests for services based on an advertised virtual topology, wherein unavailable resources in the control domain are accounted for in the advertised virtual topology, wherein the external networks are configured to provide requests for services based on the advertised virtualized topology;

wherein the virtualized topology is provided on the E-NNI such that the external networks linked by the E-NNI receive the same representation, wherein the external networks are configured to request actual resources based on the advertised virtualized topology, and wherein the external networks are configured to manipulate the advertised virtualized topology as required to maintain control over the actual resources.

14. The apparatus of claim 13, wherein the generic virtual links indicate a general ability to support connectivity between two nodes by the control domain, regardless of the type or the role of the nodes, over any communication path that is available at a time a connection request is received.

15. The apparatus of claim 13, wherein the generic virtual links are binary, wherein the generic virtual links are advertised as being up or down, having available bandwidth or not having available bandwidth, in response to a network policy or in response to a network condition.

16. The apparatus of claim 13, wherein the instantiated virtual links each indicate a physical path between two nodes in the virtualized topology to be used for connectivity between the two nodes across the control domain.

17. The system of claim 1, wherein the virtualized topology is manipulated by the control domain to control aspects of the request from another control domain.

* * * * *